United States Patent [19]

Wood

[11] 4,112,489
[45] Sep. 5, 1978

[54] DATA PROCESSING SYSTEMS

[75] Inventor: Keith William Wood, Manchester, England

[73] Assignee: International Computers Limited, London, England

[21] Appl. No.: 765,872

[22] Filed: Feb. 4, 1977

[30] Foreign Application Priority Data

Feb. 6, 1976 [GB] United Kingdom ............... 04684/76

[51] Int. Cl.² ............................................. G06F 7/00
[52] U.S. Cl. ............................................. 364/200
[58] Field of Search .................. 364/308, 304, 200, 900

[56] References Cited

U.S. PATENT DOCUMENTS

| | | | |
|---|---|---|---|
| 3,771,137 | 11/1973 | Barner et al. | 364/200 |
| 3,875,391 | 4/1975 | Shapiro et al. | 364/200 |
| 3,900,836 | 8/1975 | Salvo | 364/200 |
| 3,949,379 | 4/1976 | Ball | 364/200 |
| 3,978,452 | 8/1976 | Barton et al. | 364/200 |
| 3,988,719 | 10/1976 | Whitby et al. | 364/200 |

*Primary Examiner*—Charles E. Atkinson
*Attorney, Agent, or Firm*—Hane, Roberts, Spiecens & Cohen

[57] ABSTRACT

In a pipelined data processor, each processing stage is provided with its own copies of relevant machine registers. Whenever a processing stage updates a register, it sets a flag. The flags and register copies are shifted along in step with the flow instructions down the pipeline. These flags are used to control multiplexers which ensure that each stage is provided with the most up-do-date copy of each register, taking into account any updates by succeeding stages.

7 Claims, 11 Drawing Figures

I = INSTRUCTION FETCH.
S = STACK ADDRESS & FETCH.
O = OPERAND ADDRESS & FETCH.
E = EXECUTION.

DATA PROCESSING SYSTEMS

This invention is related to data processing systems. More specifically, the invention is concerned with a register arrangement for use in a pipelined data processing system.

A pipelined data processing system is one which has two or more processing stages in series, forming a "pipeline" through which a stream of instructions can flow. Each processing stage is arranged to execute one particular phase of each instruction, and the execution of successive instructions is overlapped. Such a system can therefore have a high processing rate compared with conventional single-stage processors.

In general, a data processor has a number of special purpose machine registers such as an accumulator, a program counter and so on. It is desirable to permit these registers to be accessed at several phases of an instruction. However, in a pipelined processor, this gives rise to an interlocking problem, in that one instruction may wish to update the contents of a particular register while a previous instruction is still being executed and still requires to read the original contents of the register. This problem can be overcome by ensuring that instructions do not update any register until all preceding instructions have completed their accesses to that register. However, this is not entirely satisfactory in that it leads to hold-ups in the pipeline and therefore reduces the overall processing rate of the system.

One object of the present invention is to provide a register arrangement for use in a pipelined processing system which overcomes the interlocking problem in a novel manner.

According to one aspect of the invention, a register arrangement for use in a pipelined data processing system comprises a sequence of registers, each having marker means for indicating whether that register contains valid information, and each register also having output means arranged to select the contents of that register if the associated marker means indicates that the register contains valid information but otherwise to select the contents of the first succeeding register (if any) in the sequence whose marker means indicates that it contains valid information, and means for shifting the contents of each register and marker means into the next register and marker means in the sequence (if any).

According to another aspect of the invention, a pipelined data processing system comprises: a sequence of data processing units respectively arranged to execute successive phases of an instruction as the instruction flows along the sequence, and a register arrangement in accordance with the first aspect of the invention, the processing units being capable of writing into respective ones of the registers and having access to the output signals from the output means of the respective registers, and the shifting means of the register arrangement being operated so as to shift the contents of the registers and marker means in step with the flow of instructions. It can be seen that the invention removes one source of hold-ups in the pipeline by providing a separate copy of a given machine register for each stage of the pipeline, so that each instruction can update its own copy without waiting for preceding instructions to complete all their read accesses to the machine register. The copies of the register are connected together so as to permit the register contents to flow through the pipeline in step with the flow of instructions. Interlocking is achieved by use of the marker means which ensure that, whenever an instruction updates a machine register, the updated value is automatically made available to all subsequent instructions in the pipeline which have not themselves updated that register. Thus, each instruction has available to it the most up-to-date value of the register contents, taking into account any updates by preceding instructions.

Although an instruction is free to update its copy of the register without waiting for previous instructions to complete their read accesses, it is desirable that an instruction should not attempt to use its copy of a register if a preceding instruction intends to update that register. This problem is overcome by use of a sequence of warning means associated with respective registers, the contents of which are shifted in step with the contents of the registers and marker means, each warning means having means for producing a warning signal output equal to the OR function of the states of all the following warning means the sequence. It will be shown that this facility can be used for giving warnings to instructions that a preceding instruction in the pipeline intends to update the register.

Because of the regular design of the register arrangement, it can readily be adapted for use in a pipelined processing system with any desired number of stages, simply by adding or removing registers from the sequence. Moreover, the regular repetitive structure of the register arrangement makes it particularly suitable for implementation using large-scale integrated circuit (LSI) technology.

One embodiment of the invention will now be described, by way of example, with reference to the accompanying drawings of which:

OVERALL VIEW OF THE SYSTEM

Figure 1:
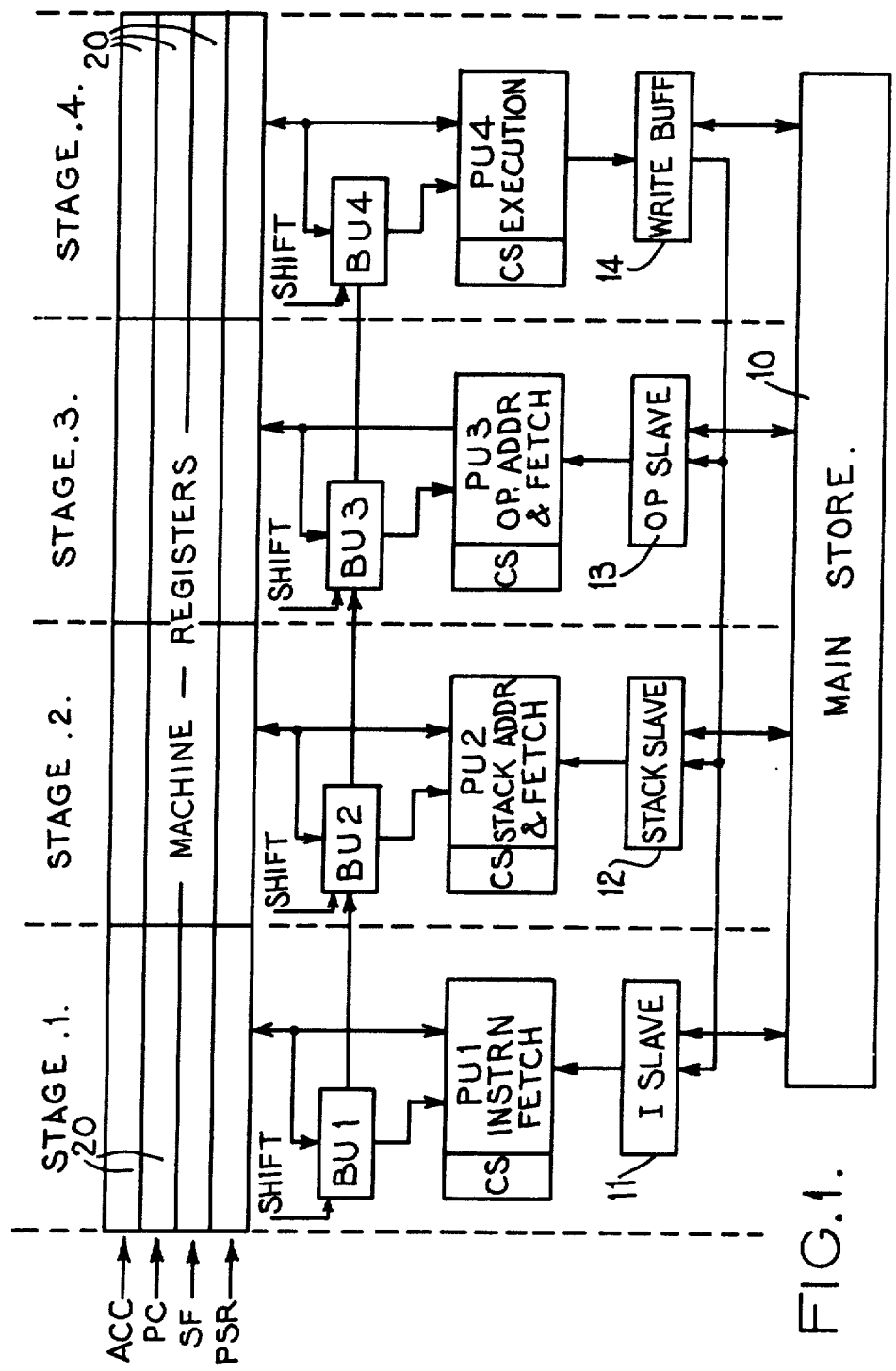
FIG. 1 is a block diagram of a four-stage pipelined processing system embodying the invention.

Referring to FIG. 1, the system comprises a four-stage pipeline. Each stage of the pipeline includes a processing unit PU, each processing unit having its own control store CS for holding microprograms which control its operation.

The processing units have respective buffer units BU. Each of these buffer units contains a buffer for holding a machine language instruction which is currently being executed by the associated processing unit, and other buffers for holding operands and other control information pertaining to that instruction. Each buffer unit also includes a decoder for decoding the instruction to produce control signals for initiating appropriate microprogram routines in the associated processing unit.

The function of the first processing unit PU1 is to fetch the next machine-language instruction of the current program in a main store 10, placing the instruction in its buffer unit BU1, and then to perform a preliminary analysis of the instruction e.g. to determine the instruction type. A relatively small but fast slave store 11 is provided to act as a buffer between the unit PU1 and the mainstore 10. This slave store is arranged to hold instructions which are likely to be required in the near future (by means of some form of look-ahead procedure), so as to reduce the effective access time for fetching instructions.

In general, each machine language instruction involves a specified operation between two operands, one of which may be obtained from a push-down stack, defined in the main store 10.

The second processing unit PU2 forms the address of the stack operand, where applicable, and then fetches this operand from the main store 10 by way of a slave store 12, placing it in its buffer unit BU2.

The function of the third processing unit PU3 is to form the address of the other (non-stack) operand and to fetch this operand from the main store by way of a slave store 13, placing it in its buffer unit BU3.

Finally, the fourth processing unit PU4 performs the specified operation (e.g. add, subtract etc.) between two previously fetched operands in its buffer unit BU4. The result is placed in a write buffer 14 from which it can be written back into the main store 10.

Each of the devices so far described (i.e. the processing units, the slave stores, the buffer units, and the write buffer) is in itself well known, and in any case their detailed structures do not form any part of the present invention and will therefore not be described in detail in this specification.

Figure 2:
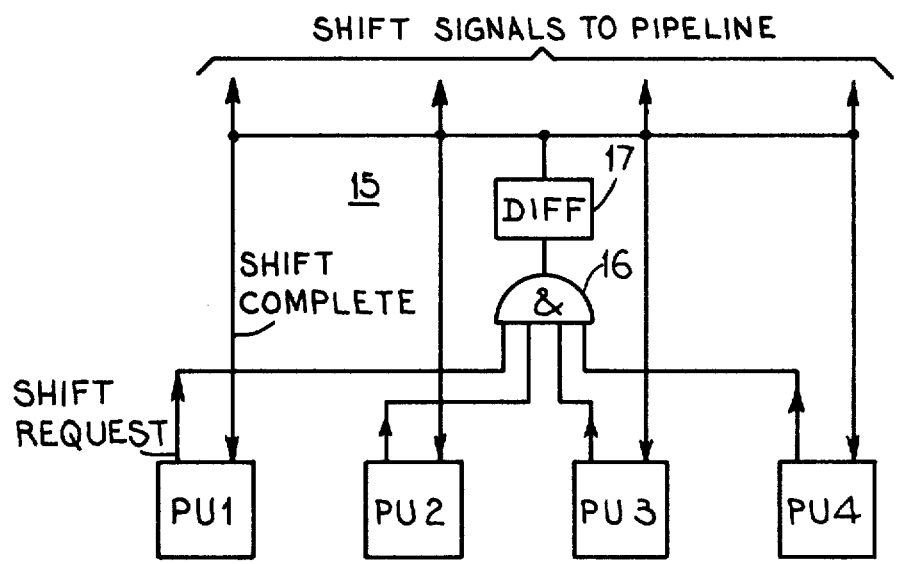
FIG. 2 is a logic diagram of a co-ordinator circuit for the system.

The flow of instructions and operands along the pipeline (from left to right as seen in the drawing) is controlled by a co-ordinator circuit 15 (FIG. 2). Whenever one of the processing units completes its current function, it produces a SHIFT REQUEST signal. The SHIFT REQUEST signals from the four units are combined in an AND gate 16, the output from which is applied to a differentiating circuit 17, which produces a SHIFT signal whenever the output of the AND gate changes from zero to one. The SHIFT signal therefore indicates that all four units have completed their current functions.

The SHIFT signal is applied to the four buffer units BU1–BU4 to cause each instruction and its associated operands (if any) to be shifted one step to the right, into the next stage of the pipeline. The instructions and operands shifted out of the last buffer unit BU4 are lost (they are now finished with), while the first buffer unit BU1 becomes empty, ready to receive the next machine language instruction to be fetched by unit PU1.

The output of the differentiating circuit 17 (FIG. 2) is also applied to all four processing units as a SHIFT COMPLETE signal to indicate that their SHIFT REQUEST signals have now been serviced. Each processing unit therefore withdraws its SHIFT REQUEST and commences execution of its function again.

Figure 3:
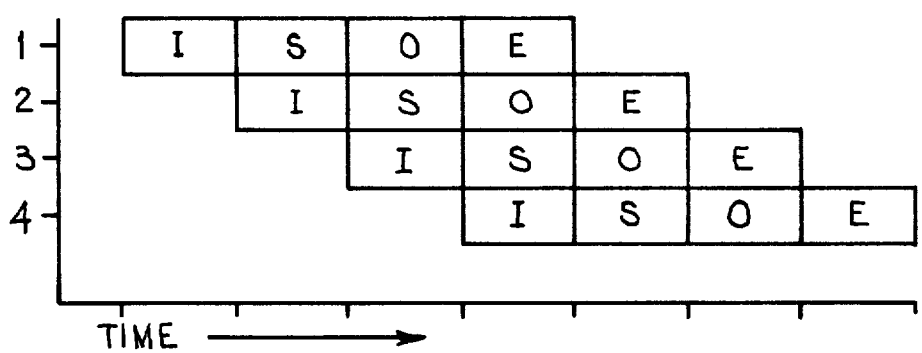
FIG. 3 is a timing diagram showing the way in which instruction execution is overlapped.

In summary, the execution of each machine-language instruction is divided into four phases, which are executed sequentially by the four processing units as the instruction flows along the pipeline. Execution of successive instructions is overlapped, and at any time there may be up to four instructions in the pipeline. This overlapping of instruction execution is illustrated diagrammatically in the self-explanatory FIG. 3.

Referring again to FIG. 1, each instruction generally involves access to one or more of four special purpose machine registers: an accumulator (ACC), a program counter (PC) a stack front register (SF), and a program status register (PSR).

The machine registers are implemented by an arrangement of sixteen basic register cells 20, four for each stage of the pipeline. The four cells in each stage (i.e. a vertical column of cells as viewed in FIG. 1) contain copies of the four machine registers and are accessible by the processing unit of that stage. The four copies of a given machine register (i.e. a horizontal row of cells) are linked together in a sequence to permit information to be shifted from one cell to the next, from left to right as viewed in the drawing. This shifting is controlled by the same SHIFT signals as are used for shifting the instructions down the pipeline. Thus, as each instruction flows along the pipeline it carries its copies of the four machine registers along with it.

BASIC REGISTER CELL

One of the basic register cells 20 will now be described in detail with reference to FIG. 4. The cell comprised a register 21 hlding 32 bits. Data can be written into the register through a two-way multiplexer 22 from either of two sources: a write data path 23 from the associated processing unit, or a data shift path 24, both these paths being 32 bits wide. The register 21 also has a 32-bit wide output data path 25 which is connected to the data shift path 24 of the corresponding cell in the next stage of the pipeline.

The cell also contains a single-bit marker flag (M flag) 26. The M flag can be written into, through a multiplexer 27, either from an M-shift line 28 or from a line which is permanently wired to receive a binary "one". The M flag also has an output line 30 which is connected to the M-shift line 28 of the corresponding cell in the next stage of the pipeline.

The two multiplexers 22, 27 are controlled by the SHIFT signal. In the absence of the SHIFT signal, both multiplexers select their lower inputs (as viewed in the drawings). Data can then be written into the register 21 from the associated processing unit over the write data path 23. Because of the permanently wired "one" input, the M flag is automatically set when the register 21 is written into.

When a SHIFT signal occurs, the two multiplexers select their upper inputs. This allows the contents of each register 21 and its M flag to be shifted to the right into the next stage of the pipeline.

The cell also has a 32-bit wide read data path 31 which provides the data output of the cell for the associated processing unit. The read data is derived through a multiplexer 32 either from the output path 25 of the register 21, or from a 32-bit wide read-back path 33. The read-back path is, in turn, connected to the output of the multiplexer 32 in the corresponding cell of the next stage. The multiplexer 32 is controlled by the output of the M flag, so as to select its upper or lower inputs according to whether the M flag is set or not.

Thus, the data output on the path 31 is as follows:
 (a) When the M flag is set, the data output is the contents of the register 21.
 (b) When the M flag is reset, the data output is the contents of the first following register in the same horizontal row of cells whose M flag is set.

This ensures that each machine language instruction automatically has available to it the most up-to-date value of the contents of each machine register, taking into account any updates by previous instructions.

READ OUT SELECTION

Figure 5:
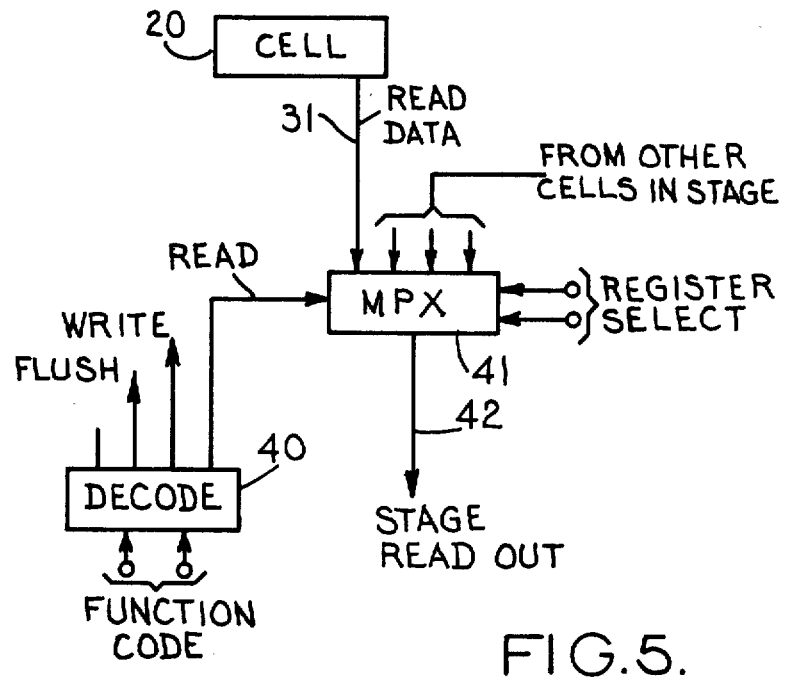

FIG. 5 shows logic for selecting read-out data from one of the four cells 20 in one stage of the pipeline.

The logic includes a decoder 40 which receives a two-bit function code from the processing unit, and produces one of three function signals; READ, WRITE and FLUSH.

The READ signal enables a four-way multiplexer 41, to select one of the read data paths 31 of the four cells. The data from the selected path is sent to the processing unit over a stage read-out path 42 (32 bits wide). The selection is controlled by two REGISTER SELECT bits from the processing unit.

WRITE SELECTION

Figure 6:
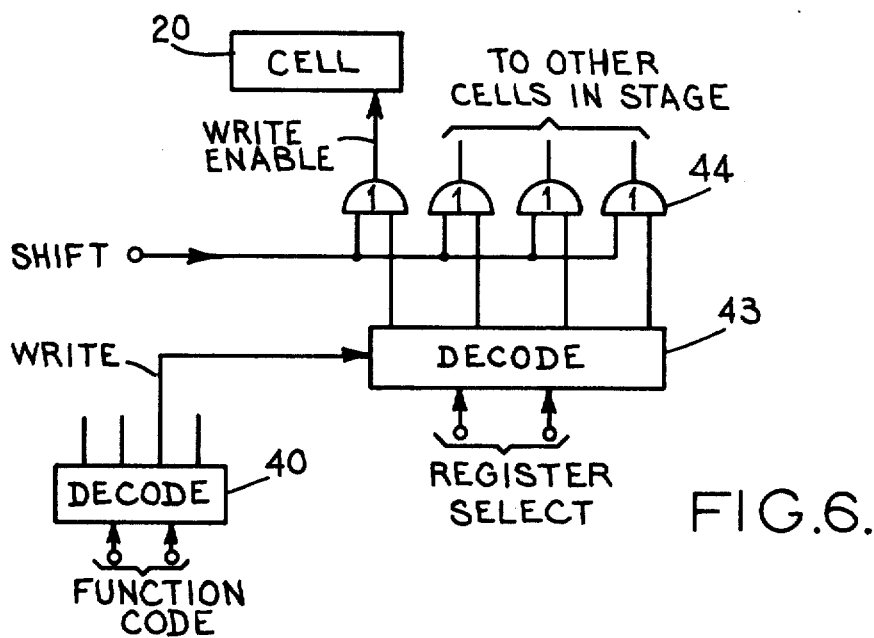

FIG. 6 shows logic for selecting one of the four cells in a stage of the pipeline for writing into.

The WRITE signal from the decoder 40 enables a decoder 43, to decode the REGISTER SELECT bits, producing a signal on one of four output lines. These lines are connected by way of OR gates 44, to WRITE ENABLE inputs of the four cells. As seen in FIG. 4, the WRITE ENABLE input of each cell enables both the register 21 and the M flag for writing into at the next clock pulse.

The SHIFT signal is also applied to the OR gates 44 (FIG. 6) so as to generate WRITE ENABLE signals for all four cells.

Figure 7:
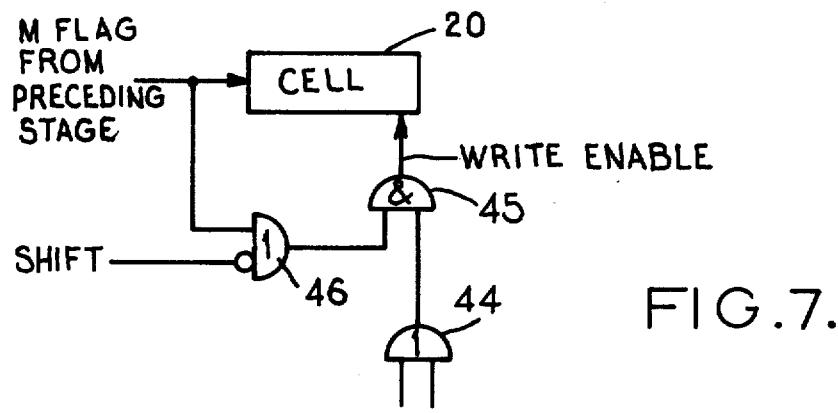

The last stage of the pipeline must act as a trap for updated register contents to prevent information becoming lost through being overwritten by invalid data. FIG. 7 shows how the arrangement of FIG. 6 is modified in the last stage of the pipeline, to trap the register contents.

Additional AND gates 45, controlled by the outputs of OR gates 46, are introduced into the WRITE ENABLE inputs. The OR gates 46 receive the inverse of the SHIFT signal and the M flags of the preceding stage. The effect of this is that, when a SHIFT signal is present, the WRITE ENABLE signal is inhibited unless the M flag of the preceding stage is set. This ensures that when a SHIFT occurs, the registers in the last stage are only overwritten by information which is accompanied by a set M flag.

PIPELINE FLUSH CONTROL

It may sometimes be necessary to abandon the execution of one or more instructions which have been partially executed in the pipeline. Such a situation may arise, for example, as the result of a synchronous interrupt, or in the event of a jump instruction whose destination has been wrongly predicted. It will then be necessary to "flush" the pipeline by effectively removing any irrelevant register updates.

This can be achieved by resetting all the M flags up to a particular stage of the pipeline.

Figure 8:
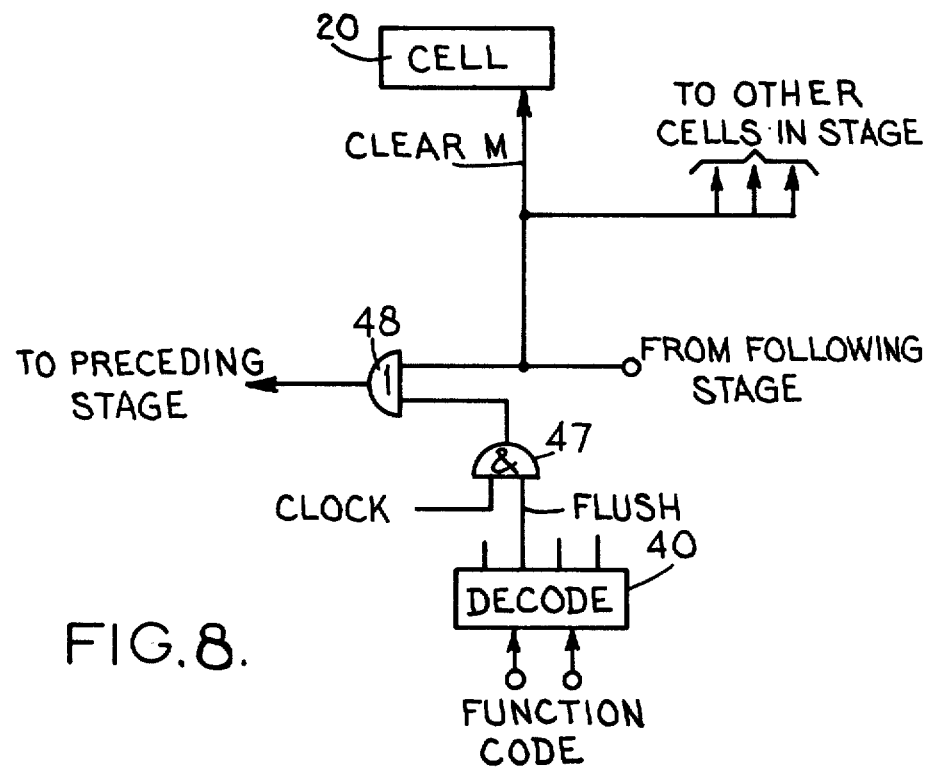

FIG. 8 shows flush control logic which permits a processing unit in one stage of the pipeline to reset the M flags in all preceding stages of the pipeline. Simiar logic is provided for each stage.

The FLUSH signal from the decoder 40 is gated, by the CLOCK signal, through an AND gate 47 into one input of an OR gate 48. The output of each OR gate 48 is connected to the other input of the corresponding OR gate in the preceding stage of the pipeline. Thus, a FLUSH signal produced by one processing unit will propagate backwards (i.e. to the left) along the pipeline to all preceding stages.

At each stage, the FLUSH signal from the following stage is applied to a CLEAR M input of all four basic register cells. As seen in FIG. 4, the CLEAR M input is applied to the M flag to reset the flag.

WARNING FLAGS

If any instruction intends to update one to the machine registers, it must declare its intention at the earliest opportunity; i.e. at the first stage of the pipeline. A warning is then given to subsequent instructions to prevent them from using that machine register until the update has actually taken place.

Figure 9:
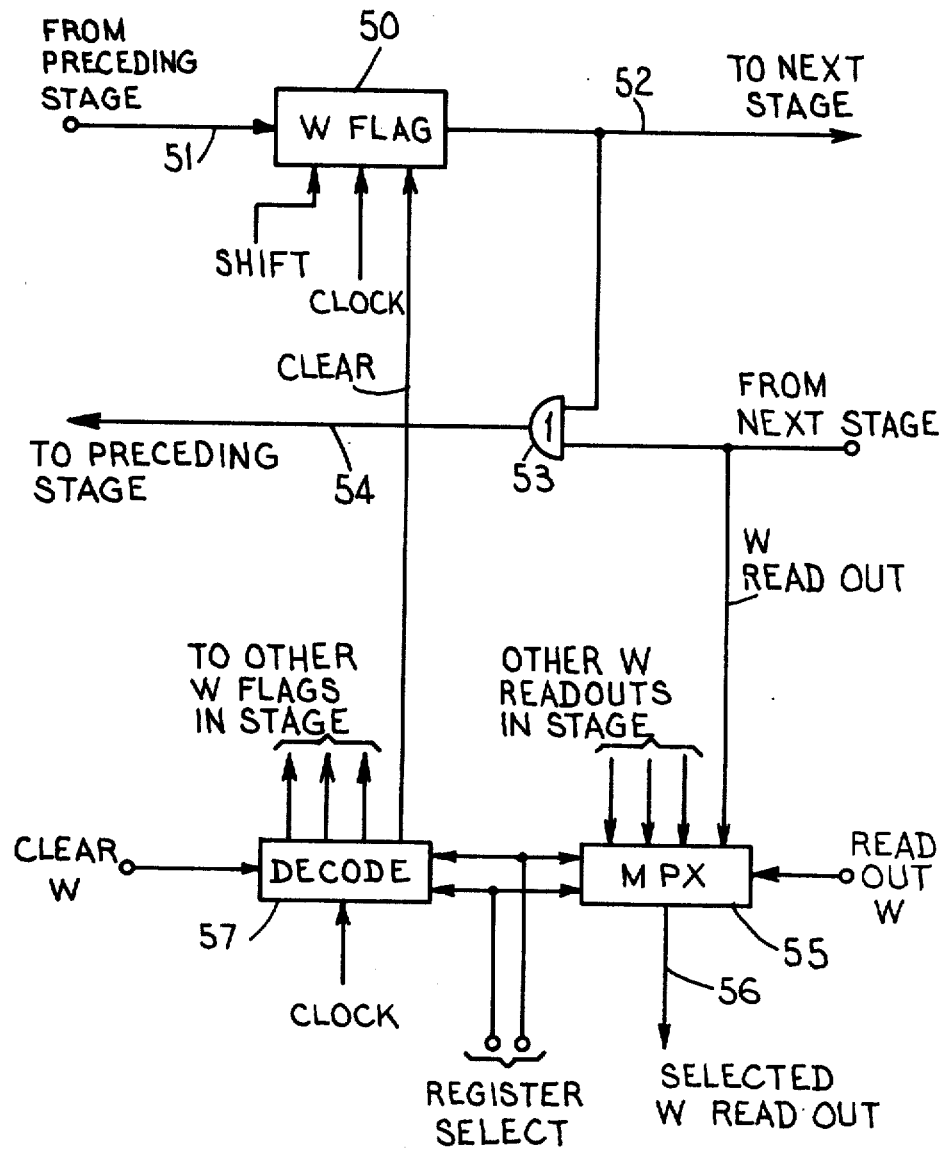

This is achieved by a system of warning flags (W flags), one for each register cell 20. One such W flag 50 is shown in FIG. 9.

Each W flag has an input line 51, and an output line 52, which is connected to the input line of the corresponding W flag in the next stage of the pipeline. The SHIFT signal is applied to a write enable input of each W flag. Thus, when a SHIFT occurs, the contents of each W flag is shifted one step down the pipeline (i.e. to the right). Thus, as an instruction flows down the pipeline it is accompanied by its associated W flags.

The input lines 51 of the four W flags in the first stage of the pipeline are connected directly to the associated processing unit PU1, so that these flags can be set directly by the processing unit. As mentioned previously, when the processing unit PU1 fetches a new instruction, it performs a preliminary analysis. One purpose of this analysis is to determine whether the instruction intends to update any of the machine registers. The unit PU1 will then set the corresponding W flags of the first stage by applying signals to the input lines 51, to act as a warning for subsequent instructions.

The output of each W flag is also applied to an OR gate 53, the output of which is connected by way of a line 54 to the other input of the corresponding OR gate 53 in the preceding stage of the pipeline. The signals received at any stage from the OR gate 53 in the following stage are used as W READ OUT signals. It will be seen that there are four such W READ OUT signals at each stage, one for each register, and each signal indicates that a previous instruction further down the pipeline (i.e. to the right) intends to update the machine register in question.

Before a processing unit reads the contents of any register, it will first of all examine the corresponding W READ OUT signal to determine whether it is free to use the contents of that register. This is done by enabling a multiplexer 55, which is controlled by the REGISTER SELECT bits, so as to select the appropriate W READ OUT signal. The selected signal is returned to the processing unit over line 56. If the processing unit finds that it is not permitted to read the register contents it will wait until it is free to do so i.e. until the previous instruction has updated the register in question and has reset the W flag. It will be appreciated that this requires a facility (not shown) in the co-ordinator circuit to "freeze" the contents of all stages of the pipeline, up to and including the stage which is waiting for permission to read a register (i.e. to inhibit the SHIFT signals to those stages), while permitting the contents of following stages to be shifted in the normal manner.

The way in which the W flags are cleared is as follows. Whenever a processing unit updates a register, it also enables a decoder 57, to decode the REGISTER SELECT bits, producing a signal on one of four outputs. These four outputs are respectively connected to CLEAR inputs of the four W flags in that stage, so as to reset the W flag of the register which is being updated.

W flags will also be cleared by the pipeline flush mechanism of FIG. 8 in the same way as the M flags.

FAST READ-BACK CHANNEL

As explained above, when a processing unit updates one of the machine registers, the updated value is passed backwards along the pipeline over the read-back paths 33, so that it is made available to all preceding stages of the pipeline. Clearly, the updated value will take a small but finite time to ripple back along the pipeline. In many systems, this ripple time will be negligible. However, where the pipeline is very long (i.e. has many stages) or if the cycle time of the processing units is very short, the ripple time may be significant.

Figure 10:
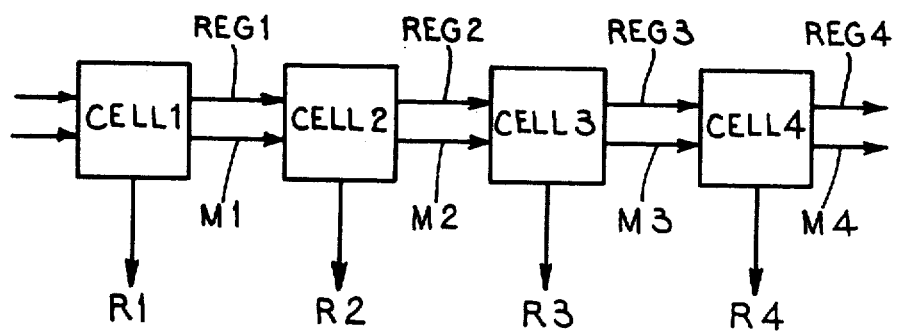
FIGS. 10 and 11 illustrate a possible modification of the system for reducing ripple times in the register arrangement.

A modification of the system will now be described, for reducing the ripple time. In this modification it is assumed that the pipeline has 16 stages, and that these are arranged in groups of four. FIG. 10 shows one basic register cell of each stage of one group of four stages. For reference, these four cells are labelled CELL 1 – CELL 4, the outputs from the registers in these cells are labelled REG 1-REG 4, and the outputs of their M flags are labelled M 1-M 4.

Figure 4:
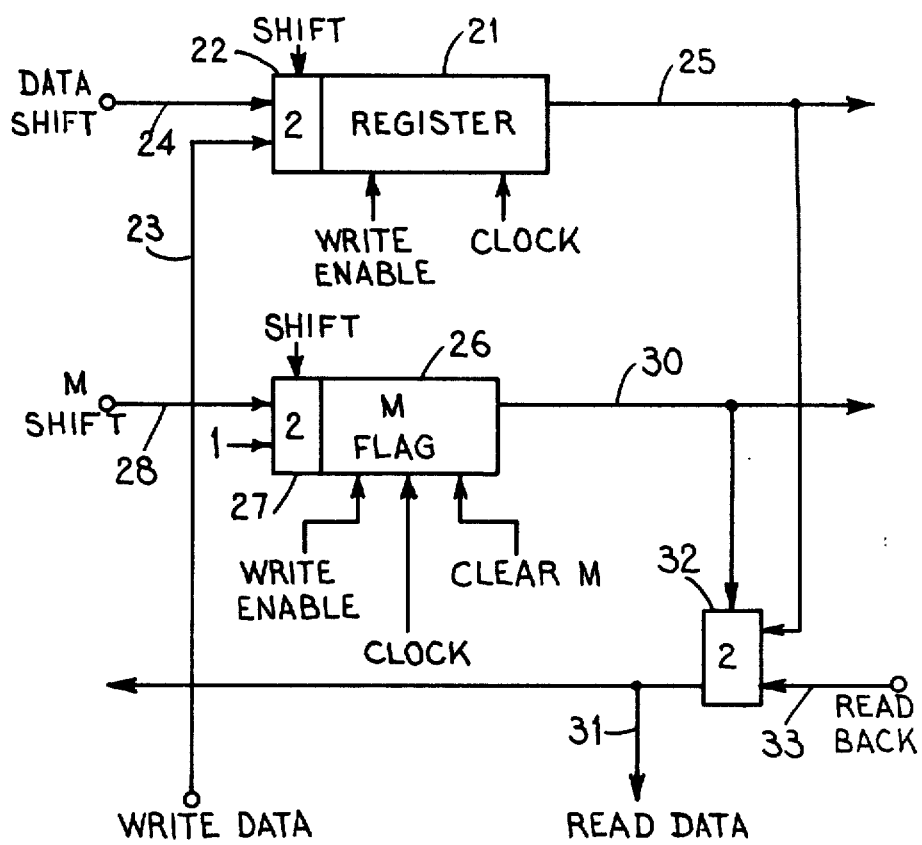
FIGS. 4-9 show the detailed structure of the register arrangement of the system.

Each of these cells is similar to the cell shown in FIG. 4, except that the multiplexer 32 is replaced by a more complex selection logic circuit. Each selection logic circuit produces a read data signal, and these read data signals are applied to respective multiplexers similar to the multiplexer 41 (FIG. 5) so as to provide a stage readout signals for the associated processing units. For reference the four read data signals from the four cells CELL 1-CELL 4 are labelled R 1-R 4.

Figure 11:
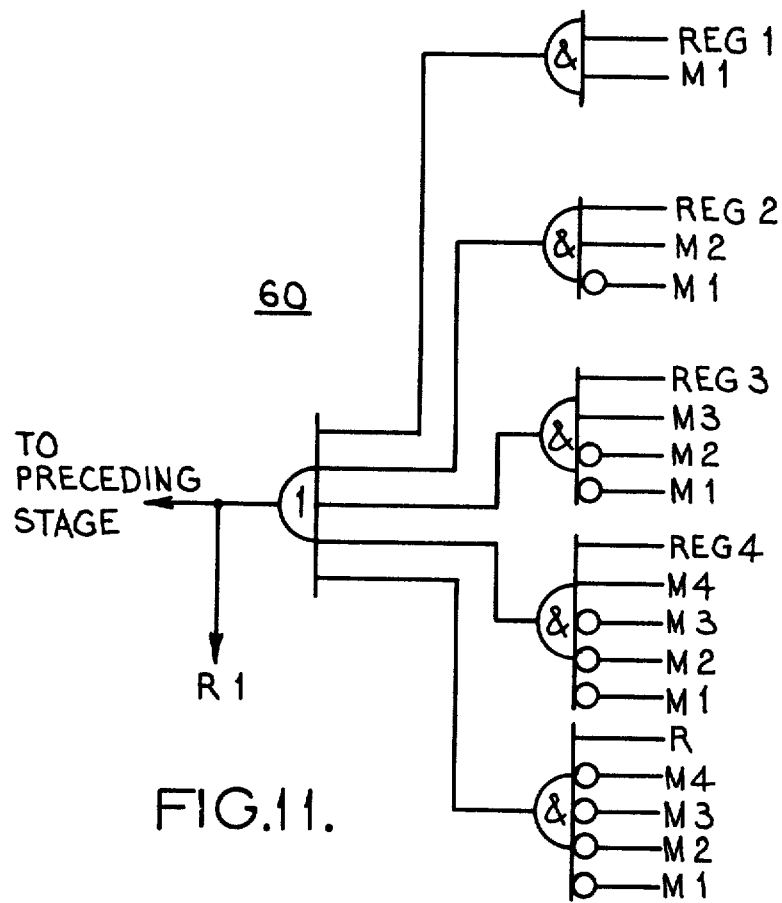

FIG. 11 shows the selection logic circuit 60 of CELL 1. This circuit combines the signals REG 1-REG 4, M 1-M 4, and a signal R (which is actually the read data signal from the first cell of the next group of cells), to form the read data signal R 1. The action of the circuit can be convenientl summarised by the following logical equation:

$$R\,1 = REG\,1.\,M\,1 + REG\,2.\,M\,2.\,\overline{M\,1} +$$
$$REG\,3.\,M\,3.\,\overline{M\,2}.\,\overline{M\,1} +$$
$$REG\,4.\,M\,4.\,\overline{M\,3}.\,\overline{M\,2}.\,\overline{M\,1} +$$
$$R.\,\overline{M\,4}.\,\overline{M\,3}.\,\overline{M\,2}.\,\overline{M\,1}.$$

The selection logic circuits in the other cells CELL 2–CELL 4 are similar to that shown in FIG. 11, and their actions are conveniently summarised by the following equations:

$$R\,2 = REG\,2.\,M\,2 + REG\,3.\,M\,3.\,\overline{M\,2} +$$
$$REG\,4.\,M\,4.\,\overline{M\,3}.\,\overline{M\,2} + R.\,\overline{M\,4}.\,\overline{M\,3}.\,\overline{M\,2}$$
$$R\,3 = REG\,3.\,M\,3 + REG\,4.\,M\,4.\,\overline{M\,3} + R.\,\overline{M\,4}.\,\overline{M\,3}.$$

$$R\,4 = REG\,4.\,M\,4 + R.\,\overline{M\,4}.$$

It can be seen that the effect of these selection logic circuits is basically the same as in the previously described arrangement, in that the read data output from each cell is equal to:

(a) the contents of the register in that cell if its M flag is set, and (b) if the M flag is reset, the contents of the first succeeding register whose M flag is set.

However, the average path length for the contents of an updated register to ripple back is considerably reduced. For example, the contents of an updated register in the next group of cells will be applied directly from the first cell in that next group to the first cell in the present group (as the signal R), instead of having to ripple back through each of the cells CELL 4–CELL 2.

AN ALTERNATIVE SHIFTING ARRANGEMENT

An alternative way in which the flow of instructions along the pipeline can be controlled is by means of a "handshaking" procedure between the processing units which replaces the co-ordinating circuit of FIG. 2. In this case, each processing unit contains a handshaking microprogram routine and communicates with adjacent processing units by means of READY and ACCEPTED signals. The handshaking microprogram routine will be described for processing unit N (where in the above example $N = 1, 2, 3,$ or 4).

Whenever unit N completes its current function in respect of an instruction it sends a READY signal to unit $N + 1$. It then waits for unit $N + 1$ to accept the instruction into its own buffer unit. This will be indicated by receipt of an ACCEPTED signal from unit $N + 1$. Unit N now waits for a READY signal from unit $N - 1$. When it receives this, it issues a SHIFT signal to its associated buffer so as to shift in the instruction from the preceding buffer. When this is done, Unit N transmits an ACCEPTED signal to unit $N - 1$. Unit N is now ready to start performing its function in respect of this new instruction.

It will be seen that in this modification, the SHIFT signals to the different stages of the pipeline are not all produced simultaneously. In fact, each SHIFT signal is produced at substantially the earliest possible moment in time. Thus, in general, the flow of instructions down the pipeline will be more rapid than with the previously described arrangement.

SOME OTHER POSSIBLE MODIFICATIONS

It will be appreciated that many modifications to the system are possible without departing from the scope of the invention. For example, different numbers of stages may be provided in the pipeline, and different numbers of machine registers may be provided.

LARGE SCALE INTEGRATION

As mentioned previously, the invention is particularly suitable for implementation by LSI techniques. For example, one LSI chip may contain one basic register cell from each of four successive stages of the pipeline (i.e. a horizontal row of cells as viewed in FIG. 1). The same chip may also contain the W flags.

Such a chip would contain about 150 logic gates and could be accommodated within a conventional 24-pin package.

I claim:

1. A register arrangement for use in a pipelined data processing system, the arrangement including;
   a plurality of information registers each having an input and an output;
   first shift paths interconnecting the registers in series to form a sequence, each shift path being connected between the output of one register and the input of the next register in the sequence;

separate marker registration means associated respectively with each of the registers settable to indicate validity of information contained in the associated register;

second shift paths interconnecting the marker registration means into a sequence corresponding to that of the registers;

an output path corresponding to each register;

output control means for each output path responsive to setting of the marker registration means associated with the corresponding register to apply to the output path information contained within that register if the marker registration means is set to indicate validity of that information and otherwise to apply to the output path information from the first succeeding register, if any, of the sequence whose associated marker registration means is set; and shift control means to generate shift control signals, the information registers and marker registration means being responsive to the shift control signals to shift their contents over the first and second shift paths respectively in synchronism each into the next succeeding register and registration means respectively of the sequence.

2. A register arrangement according to claim 1 including means for generating an enabling signal and for applying the enabling signal to enable an information register to receive information to be entered therein, the associated marker registration means being responsive to the enabling signal to be set to indicate validity of the entered information.

3. A register arrangement according to claim 1 in which said output control means includes a multiplexer having an output connected to the output path, a first input connected to the associated register and a second input connected to the output of the corresponding multiplexer associated with the next register in the sequence (if any), each multiplexer being responsive to the setting of the associated marker registration means to select the first input when the associated marker registration means indicates that its associated register contains valid information and otherwise to select the second input.

4. A register arrangement according to claim 1 including first gating means responsive to the setting of the penultimate marker registration means to permit the contents of the penultimate register in the sequence to be shifted into the last register of the sequence only if the penultimate registration means is set to indicate the presence of valid information in the penultimate register.

5. A register arrangement according to claim 1 including;

means associated with each register of the sequence for generating a flushing signal; and second gating means associated with each register of the sequence connected to receive a flushing signal; to pass the received signal to the second gating means associated with the preceding register of the sequence; and to apply only that flushing signal received from the second gating means associated with the succeeding register of the sequence to reset the marker registration means, whereby the flushing signal produced by the generating means associated with a particular register of the sequence is passed to reset the marker registration means associated with all those registers of the sequence preceding that whose associated generating means produced the signal, to indicate that those preceding registers contain invalid information.

6. A register arrangement according to claim 1 including;

a separate warning registration means associated respectively with each of the registers settable to indicate that the contents of the associated register are to be updated;

third shift paths interconnecting the warning registration means into a sequence corresponding to that of the registers, the warning registration means being responsive to the shift control signals to shift their contents over the third shift paths respectively each into the next succeeding warning registration means of the sequence in synchronism with the shifting of the contents of the registers along the sequence;

third gating means associated with each register interconnecting the warning registration means to derive a signal from a set warning registration means and to pass the derived signal to the third gating associated respectively with all those preceding registers of the sequence to indicate for any one of said preceding registers that the warning registration means associated with at least one of the succeeding registers of the sequence is set.

7. A pipelined data processing system comprising a sequence of data processing stages, each stage including a data processing unit, arranged to execute successive phases of an instruction as the instruction flows along the sequence, the sequence of stages respectively including a register arrangement according to claim 1, the register sequence corresponding to the stage sequence; each stage further including means connecting the processing unit to the corresponding register of the register arrangement to permit the processing unit to write information into the register and to receive output signals from the register; and in which the shift control means is operable to generate the shift control signals to shift the contents of the registers along the sequence in synchronism with the flow of instructions.

* * * * *